United States Patent [19]
Wallace et al.

[11] Patent Number: 5,455,523
[45] Date of Patent: Oct. 3, 1995

[54] METHOD AND APPARATUS FOR NON-LINEAR TRANSMISSION LINE TERMINATION

[75] Inventors: Dean A. Wallace, Plano; Brad P. Whitney, Garland; Todd M. Neale, Carrollton; Mark E. Granahan, Dallas, all of Tex.

[73] Assignee: Texas Instruments Incorporated, Dallas, Tex.

[21] Appl. No.: 301,155

[22] Filed: Sep. 6, 1994

Related U.S. Application Data

[63] Continuation of Ser. No. 135,753, Oct. 12, 1993, abandoned, which is a continuation of Ser. No. 902,608, Jun. 17, 1992, abandoned.

[51] Int. Cl.[6] .......................... H03K 17/16; H03K 19/082
[52] U.S. Cl. .............................. 326/30; 326/89; 327/76; 327/322; 327/327
[58] Field of Search ........................... 307/490, 491, 307/540, 542, 567; 379/394, 397, 398, 401; 375/36; 333/22 R; 326/30, 89; 327/74, 76, 108, 109, 315, 321, 318, 322, 327, 330, 331

[56] References Cited

U.S. PATENT DOCUMENTS

| 3,828,202 | 8/1974 | Stopper | 326/30 |
| 3,937,988 | 2/1976 | DeClue et al. | 307/296.6 |
| 4,135,062 | 1/1979 | Ferrieu | 379/398 |
| 4,345,171 | 8/1982 | Harris, Jr. | 326/30 |
| 4,436,961 | 3/1984 | Heilig | 379/398 |
| 4,797,904 | 1/1989 | Dekker et al. | 375/36 |
| 4,943,739 | 7/1990 | Slaughter | 333/22 R |
| 4,972,432 | 11/1990 | Wilson et al. | 375/36 |
| 5,220,211 | 6/1993 | Christopher et al. | 326/30 |

Primary Examiner—Edward P. Westin
Assistant Examiner—Richard Roseen
Attorney, Agent, or Firm—W. James Brady, III; Richard L. Donaldson

[57] ABSTRACT

A non-linear transmission line terminator (10) is provided in which voltages appearing on a transmission line are sensed. If the voltage level sensed is equal to a predetermined voltage, the non-linear transmission line terminator (10) couples a reference voltage to the transmission line. If the sensed voltage is less than the predetermined voltage, the non-linear transmission line terminator (10) delivers current to the transmission line having a magnitude related non-linearly to the sensed voltage.

18 Claims, 3 Drawing Sheets

BOULAY

220/330 RESISTORS

FIG. 4a
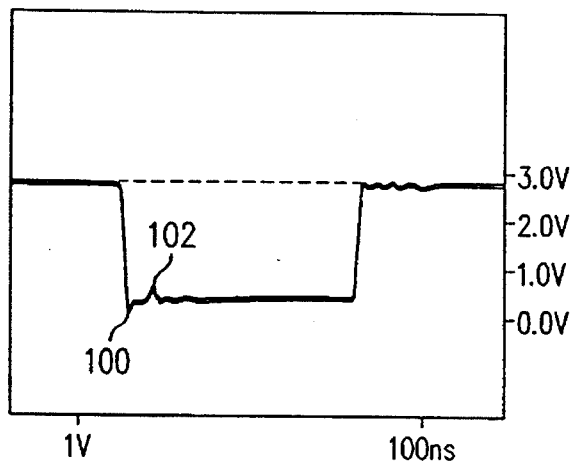
FIG. 4b
FIG. 4c
BOULAY
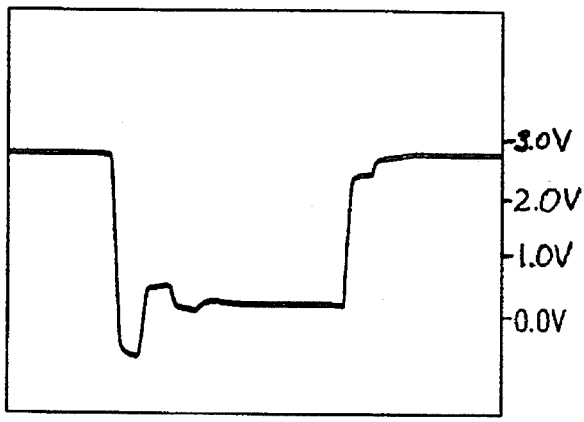
FIG. 4d
220/330 RESISTORS
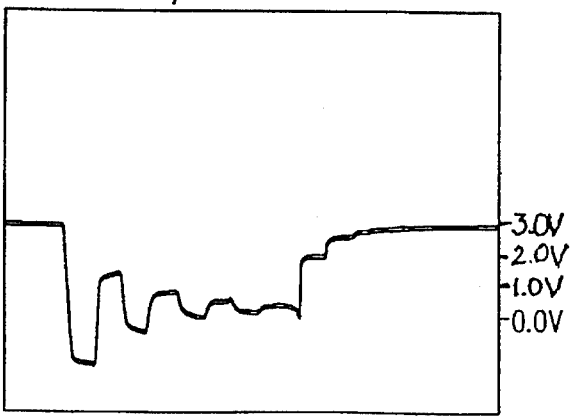

METHOD AND APPARATUS FOR NON-LINEAR TRANSMISSION LINE TERMINATION

This application is a continuation of application Ser. No. 08/135,753, now abandoned, filed Oct. 12, 1993, which is a continuation of Ser. No. 07/902,608, filed Jun. 17, 1992, now abandoned.

TECHNICAL FIELD OF THE INVENTION

This invention relates generally to electronic circuits, and more particularly to a method and apparatus for non-linear transmission line termination.

BACKGROUND OF THE INVENTION

In digital electronic systems, data is often transmitted across transmission lines. On such transmission lines, the most efficient transfer of data from a transmitter to a receiver at the end of the line occurs when the terminator impedance matches the cable impedance. "Matching" occurs when the impedance of the terminator equals the characteristic impedance of the transmission line. Transmission line terminators are connected to the ends of transmission lines to provide for impedance matching. Existing terminators for transmission lines, such as small computers systems interface ("SCSI") interface cables, have significant limitations.

In typical transmission lines, such as the SCSI interface, a transmitter will assert the transmission line or deassert the transmission line. By asserting the transmission line, the transmitter may pull the transmission line to a particular voltage, such as 0.5 volts. By deasserting the line, a transmitter releases the line, allowing it to rise to a high voltage, which, in SCSI systems is about 2.85 volts. Transmission line terminators are designed to insure that the voltage levels associated with these assertions and deassertions are received by receivers along the transmission line. In particular, transmission line terminators supply current to the transmission line when the transmission line is pulled to a particular voltage, for example 0.5 volts, and should act as voltage sources when the transmission line is driven to a particular voltage, such as 2.85 volts.

FIG. 1 illustrates the I–V characteristics of transmission line terminators. As shown by curve 1, representing the ideal terminator, a maximum terminator current is supplied until the voltage reaches a particular level. When that voltage level is reached, the terminator should act as a voltage source and provide zero current. As an example, in typical SCSI applications, the high output voltage ("$V_{oh}$") is approximately 2.5 volts, and a somewhat higher voltage, for example 2.85 volts, is the open circuit voltage ("$V_{oc}$"), with receivers registering a high output voltage at about 2.0 volts. Thus, until the transmission line cable reaches 2.85 volts, an ideal terminator would supply maximum current. Once the transmission line reaches 2.85 volts, the terminator should behave as a voltage source to maintain the voltage level.

Existing transmission line terminators provide for resistive termination. For example, one approach uses two resistors in series connected between a reference voltage and ground, with a typical reference voltage of 4.75 volts and resistor values of 220 ohms and 330 ohms (known as a 220/330 resistor terminator). The transmission line is terminated between the two resistors. In this manner, current is supplied from the reference voltage to the transmission line until the voltage on the transmission line reaches the open circuit voltage $V_{oc}$. FIG. 1 illustrates the I–V characteristic of such a terminator. As can be seen from this graph, the 220/330 terminator fails to provide relatively large amounts of current over a wide range of voltages.

Another existing approach to resistive termination involves the use of a voltage regulator connected to the transmission line through a resistor, known as a Boulay terminator. In SCSI applications, this resistor has a value of 110 ohms and the voltage regulator would have a voltage of approximately 2.85 volts. The I–V characteristic of this terminator is shown in FIG. 1. As can be seen, this terminator also fails to supply relatively large amounts of current for a wide range of voltages on the transmission line.

Therefore, a need has arisen for a non-linear transmission line terminator capable of outputting relatively constant amounts of current over a wide range of transmission line voltages.

SUMMARY OF THE INVENTION

In accordance with the present invention, a method and apparatus for non-linear transmission line termination is provided which substantially eliminates or reduces disadvantages or problems associated with prior transmission line terminators. In particular, voltages appearing on a transmission line are sensed. If the sensed voltage is equal to a predetermined voltage, voltage reference circuitry will couple a reference voltage to the transmission line. If the sensed voltage is less than the predetermined voltage, current supply circuitry will deliver current to the transmission line.

An important technical advantage of the present invention is its ability to deliver current that is related non-linearly to the sensed voltage on the transmission line. This important technical advantage insures that true logic levels are received at receivers along the transmission line without having to wait for reflections.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIGS. 3b–3d are oscilloscope tracings of transmission line voltages for different terminators used in connection with the configuration shown in FIG. 4a;

FIG. 4a is a diagram showing a particular configuration of a transmitter, receiver, transmission line, and terminator; and FIGS. 4b–4d are oscilloscope tracings of transmission line voltages for different terminators.

DETAILED DESCRIPTION OF THE INVENTION

Figure 1:
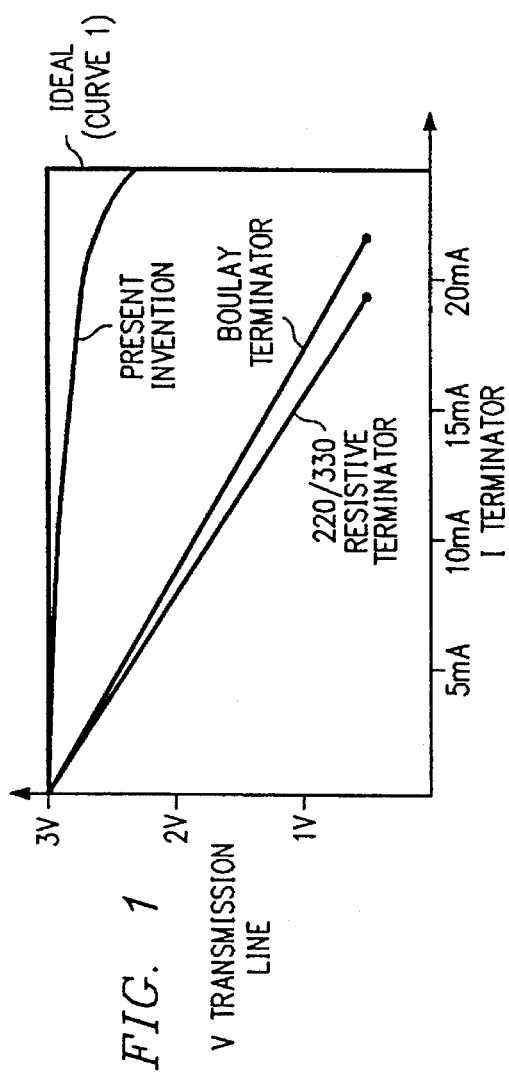
FIG. 1 is a graph of the I–V characteristics of several transmission line terminators.

FIG. 1 is a graph of the I–V characteristics of a transmission line terminator constructed according to the teachings of the present invention, an ideal terminator, and existing terminators. The vertical axis represents voltages appearing on the transmission line at the terminator, and the horizontal axis represents current output by the transmission line terminator. The graph of FIG. 1 illustrates typical voltages in a SCSI interface transmission line, although it should be understood that the present invention operates in other systems as well. In a SCSI system, transmitters will assert the line by pulling the transmission line low, to a voltage of approximately 0.5 volts. The line is said to be deasserted when the transmitters release the line and allow it to rise to a high voltage, $V_{oc}$, of approximately 2.85 volts. Receivers will register a logic high level at a voltage of approximately 2.0 volts. Before discussing the graph of FIG. 1, it is helpful to briefly discuss reflections along a transmission line.

As a transmitter, such as a Texas Instruments 75CO8 transceiver, releases the transmission line to a particular voltage, the voltage will propagate along the transmission line. Because of losses along the transmission line, characterized by the intrinsic impedance of the transmission line, the voltage appearing at the end of a transmission line will be different than that generated at the transmitter. Because of the characteristics of transmission lines, voltage signals propagating along the transmission line will be reflected from discontinuities in the transmission line, such as the ends of the transmission line. As these reflected voltage signals propagate along the transmission line, they cause the voltages appearing at points on the transmission line to step to different levels. Thus, for example, if a transmitter releases the line such that it is to rise to 2.85 volts, a point along the transmission line, such as the end of the transmission line, will rise to a voltage level, such as 1.9 volts, and then will step up to another level, such as 2.5 volts, when the reflection from the other end reaches that point. It is an important objective of the present invention to assure that voltages appearing at this first step be at levels recognizable as true logic states, such as 2.0 volts for SCSI systems.

To reach these true logic states, transmission line terminators are designed to output current to the transmission line when a transmitter pulls the line low. As shown in FIG. 1, an ideal terminator would output maximum current to the transmission line when the voltage on the transmission line is less than $V_{oc}$, for example 2.85 volts. Once the level of the transmission line reaches the true output high voltage, the terminator should output zero current, and behave as a voltage source, maintaining the transmission line at 2.85 volts.

As is shown in FIG. 1, the I–V characteristic of the terminator constructed according to the teachings of the present invention provides for a greater output current than existing terminators when the voltage on the transmission line is less than $V_{oc}$. Furthermore, as can be seen from FIG. 1, the I–V characteristic of a transmission line terminator constructed according to the teachings of the present invention is non-linear. This I–V characteristic of the present invention is important, for example, in systems where the transceivers (devices acting as both transmitters and receivers) are open drain or open collector devices, since when the transmission line is released the first voltage step is provided by the formula:

$$V_{da}=V_{ol}+IZ_0,$$

where $V_{ol}$ is the transceiver low voltage, I is the current from the terminators, and $Z_0$ is the cable impedance. Thus, for fixed cable impedance, the first step (the voltage level before the first reflection) is higher for higher currents output by the terminator. For transceivers at the end of the cable, and thus near the transmission line terminator, the first voltage step will be higher because of the infeed of current from the terminator constructed according to the teachings of the present invention, because of the large current being delivered. For example, when the transmission line rises to approximately 2 volts, as shown in FIG. 1, the current delivered by a terminator constructed according to the teachings of the present invention is still relatively large compared to the currents delivered by existing terminators.

Figure 2:
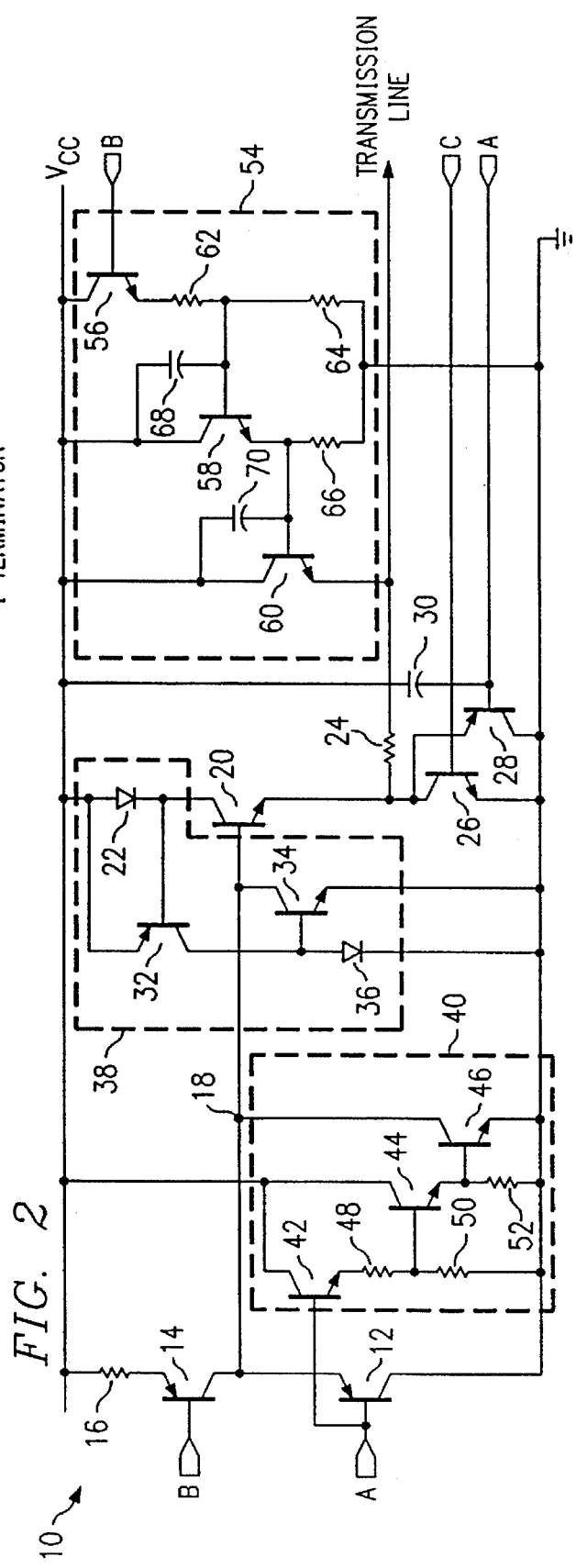
FIG. 2 is a schematic circuit diagram of a transmission line termination cell constructed according to the teachings of the present invention.

FIG. 2 is a circuit diagram of a transmission line termination cell 10 constructed according to the teachings of the present invention. As shown in FIG. 2, a transistor 12 receives an input A into its base. Input A is a voltage reference input from a voltage reference generally known in the art. The collector of transistor 12 is coupled to the ground and its emitter is coupled to the collector of a transistor 14. The base of transistor 14 is coupled to an input B and its emitter is coupled to $V_{cc}$ through a resistor 16. Input B is a current reference input from a current reference generally known in the art.

The emitter of transistor 12 is coupled to node 18. Node 18 is coupled to the base of a transistor 20 which comprises sensing circuitry operable to sense a voltage on the transmission line. The collector of transistor 20 is coupled to $V_{cc}$ through a diode 22. The emitter of transistor 20 is coupled to the transmission line through a resistor 24. The emitter of transistor 20 is also coupled to the collector of a transistor 26. The base of transistor 26 is coupled to a current reference input C, and its emitter is coupled to ground. Inputs A, B, and C to termination cell 10 are input from a reference cell generally known in the art. These inputs will be discussed below.

The emitter of transistor 20 is also coupled to the emitter of a transistor 28, and the collector of transistor 28 is coupled to ground. The base of transistor 28 is coupled to input A and is coupled to $V_{cc}$ through capacitor 30. The collector of transistor 20 is also coupled to the base of a transistor 32. The emitter of transistor 32 is coupled to $V_{cc}$, and the collector of transistor 32 is coupled to the base of a transistor 34 and to ground through a diode 36. The collector of transistor 34 is coupled to node 18, and the emitter of transistor 34 is coupled to ground. Transistors 32 and 34 and diodes 22 and 36 comprise a current control circuit 38, for controlling current flow through transistor 20.

In operation, transistor 20 is an output driver for driving the transmission line through resistor 24. Transistor 14 is a current source which supplies the base current for the output driver transistor 20. The base of transistor 14 is coupled to input B. Current reference B supplies sufficient base drive to transistor 14 to keep transistor 14 on when the voltage on the transmission line is less than $V_{oc}$. In the embodiment shown in FIG. 2, for use with a SCSI interface, this base drive current is approximately 0.12 milliamps.

When a transmitter on the transmission line pulls the line low, the voltage at the emitter of transistor 20 is pulled low, which in turn shuts off transistor 12, leaving transistor 14 to supply the base current for transistor 20. The feedback from current control circuit 38 controls the current output to the transmission line during this situation. When the transmission line is deasserted, transistor 20 continues to supply relatively large current until the voltage of the transmission line becomes high enough to turn transistor 12 on, causing transistor 12 to shunt the base drive to transistor 20, at which point the voltage on input signal A, which is input to the base of transistor 12, is output on the transmission line. Thus, the voltage level of voltage reference A may equal the deasserted voltage level, which for SCSI systems is approximately 2.85 volts.

Input signal C provides base drive for transistor 26. Transistor 26 biases transistor 20 when the transmission line is high. The current from input C is sufficient to keep transistor 26 on when the voltage on the transmission line is approximately equal to $V_{oc}$, and, in the embodiment in FIG. 2 this current is approximately 0.1 milliamps.

A thermal shutdown circuit 40 may be provided, and is included in the embodiment shown in FIG. 2. Thermal shutdown circuit 40 comprises transistors 42, 44, and 46, and resistors 48, 50 and 52. The collector of transistor 42 is coupled to $V_{cc}$, and its emitter is coupled to ground through resistors 48 and 50. As shown in FIG. 2, the base of transistor 44 is coupled to resistor 48 and coupled to ground through resistor 50. The collector of transistor 44 is coupled to $V_{cc}$, and its emitter is coupled to ground through resistor 52. The emitter of transistor 44 is also coupled to the base of transistor 46. The emitter of transistor 46 is coupled to ground and the collector of transistor 46 is coupled to node 18. The thermal shutdown circuit 40 operates to shutdown operation of the terminator when temperatures rise above operating limits.

Transistor 28 comprises a positive clamp and sinks current from drivers on the line that are not open drain or open collector devices to prevent overshoot during active negation. A negative clamp undershoot circuit 54 is provided for preventing undershoot when transistor 20 is outputting current. Negative clamp undershoot circuit 54 comprises transistors 56, 58, and 60, resistors 62, 64, and 66, and capacitor 68 and 70. The collector of transistor 56 is coupled to $V_{cc}$, and its base is coupled to input B. The emitter of transistor 56 is coupled to ground through resistors 62 and 64. The collector of transistor 58 is coupled to $V_{cc}$ and to the base of transistor 58 through capacitor 68. The base of transistor 58 is also coupled to resistor 62 and to ground through resistor 64. The emitter of transistor 58 is coupled to ground through resistor 66. The base of transistor 60 is coupled to the emitter of transistor 58, and to the collector of transistor 60 through capacitor 70. The collector of transistor 60 is coupled to $V_{cc}$, and the emitter of transistor 60 is coupled to the transmission line.

Figure 3A:
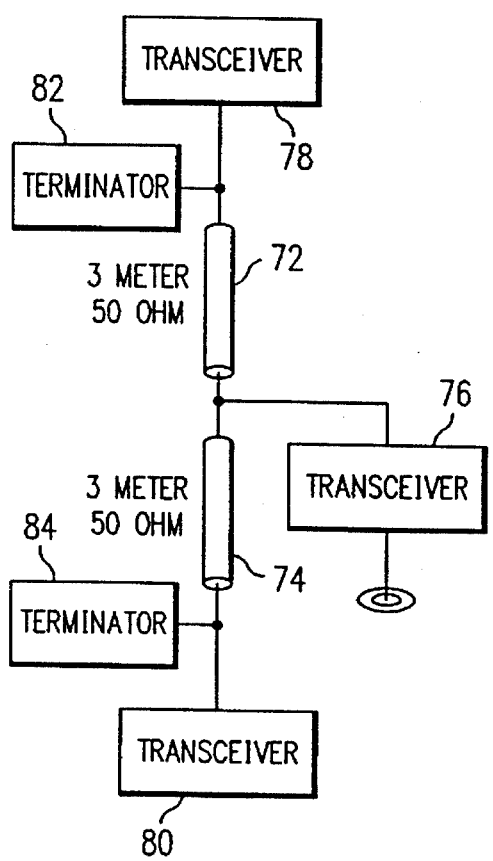
FIG. 3a is a diagram of a particular configuration of a transmitter, receiver, transmission line, and terminator.

FIG. 3a is a diagram of a configuration used to test a transmission line terminator constructed according to the teachings of the present invention. As shown in FIG. 3a, two transmission cables 72 and 74 are coupled to a transceiver 76, which may comprise a Texas Instruments 75C08 transceiver. The transmission lines 72 and 74 used were both 3 meter, 50 ohm cables. Coupled to the ends of transmission lines 72 and 74 are transceivers 78 and 80, respectively. Also coupled to the ends of transmission cable 72 and 74 are transmission line terminators 82 and 84, respectively.

Figure 3B:
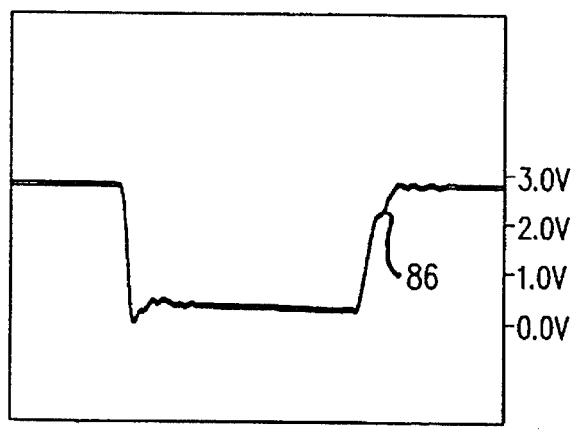
Figure 3C:
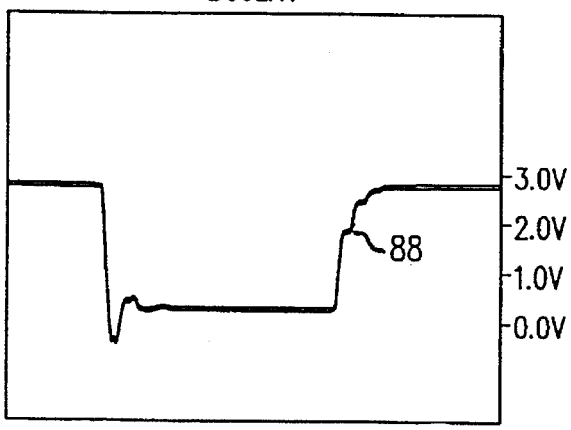
Figure 3D:
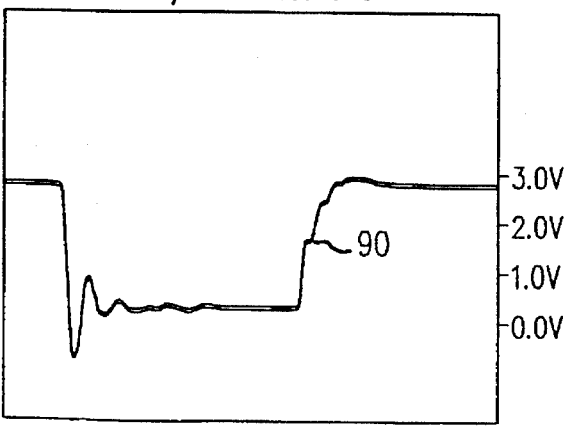

FIGS. 3b, 3c, and 3d show the results of tests done with the configuration shown in FIG. 3a, with a signal frequency of 1 megahertz. FIG. 3b shows an oscilloscope tracing of the voltage signal appearing at the end of the transmission line with a transmission line terminator constructed according to the teachings of the present invention. FIGS. 3c and 3d show the voltage appearing at the end of the transmission line using a Boulay terminator and a 220/330 resistor terminator, respectively. As can be seen in FIG. 3b, a terminator constructed according to the teachings of the present invention provides enough current so that the first step on the transmission line, shown as reference 86 in FIG. 3b, is above 2.0 volts. Thus, a true logic level is achieved on the first step with a terminator constructed according to the teachings of the present invention. As shown in FIGS. 3c and 3d, a true logic level is not reached until the second step. As shown in FIGS. 3c and 3d, steps 88 and 90, respectively, are below 2.0 volts.

FIGS. 4a, 4b, 4c, and 4d illustrate another configuration used to test the present invention. As shown in FIG. 4a, a transmission line 92 is driven by a transmitter 94. Transmitter 94 may comprise a Texas Instruments 75451B transceiver. Transmission line 92 comprised a 6 meter, 50 ohm line. At both ends of the transmission cable 92, are connected terminators 96 and 98. FIGS. 4b, 4c, and 4d show the voltages appearing at the end of transmission line 92 when different terminators are used. FIG. 4b represents the voltage appearing when a terminator constructed according to the teachings of the present invention is used. FIG. 4c represents a voltage appearing at the end of the transmission line 92 using a Boulay terminator, and FIG. 4d represents the voltage appearing at the end of the transmission line 92 using a 220/330 resistor terminator. The FIGS. 4b, 4c, and 4d represent a test where the transmitter was transmitting as signal having a frequency of 1 megahertz.

As shown in FIG. 4b, when transmitter 94 pulls the transmission line 92 low, the voltage appearing at the end of line 92 with a terminator constructed according to the teachings of the present invention reaches a true low voltage without substantial undershoot. The peaks shown by reference numerals 100 and 102 represent reflections, but it should be noted that the terminator of the present invention supplies sufficient current to prevent these reflections from causing voltage deviations out of the range of a true logic state.

As shown in FIG. 4c, the Boulay terminator results in significant undershoot and then overshoot to the true low value when the first reflection occurs. Thus, a true low logic state is not reached until the second reflection occurs. Similarly, the results of a 220/330 resistor terminator in FIG. 4d illustrate that significant undershoot and overshoot occurs with the 220/330 resistive scheme resulting in substantial error in the voltage signal.

It should be recognized that the intended scope of the present invention, including the concept of non-linear termination, applies to many transmission line systems, and that the illustrations used above in connection with the SCSI interface have been only for purposes of teaching the important advantages of the present invention. For example, the present invention may also operate with many known buses, including those used in VME-BUS systems, FUTURE-BUS systems, STD-BUS systems, MULTIBUS-I systems, other single ended bus systems, back plane systems, as well as multi-level digital systems (those with more than just two digital levels), and with systems in which "asserted" corresponds to high voltages, such as 5 volts, and "deasserted" corresponds to low voltages, such as zero volts. Furthermore, the output voltage and current of the present invention may be adjusted to meet the requirement of various systems.

It should be understood that the present invention operates not only in conjunction with receivers, but also with transmitters and/or transceivers. Also, the present invention may be implemented in the single integrated circuit that comprises the receiver or transmitter, or may be implemented as a stand alone device. Similarly, the present invention may be implemented with discreet components or separate chips. Furthermore, one non-linear terminator may be used in connection with each receiver and/or transmitter.

Although the present invention has been described in detail, it should be understood that various changes, substitutions and alterations can be made without departing from the spirit and scope of the invention as defined solely by the appended claims.

What is claimed is:

1. A transmission line terminator for use on a transmission line, comprising:

sensing circuitry operable to sense a voltage on said transmission line;

voltage reference circuitry coupled to said sensing circuitry and operable to couple a reference voltage to said transmission line in response to said sensing circuitry sensing a predetermined voltage on said transmission line; and current supply circuitry coupled to said sensing circuitry and operable to deliver current to said transmission line in response to said sensing circuitry sensing voltages less than said predetermined voltage, said delivered current having a magnitude non-linearly related to said sensed voltage.

2. The transmission line terminator of claim 1, wherein said predetermined voltage equals said reference voltage.

3. The transmission line terminator of claim 1, and further comprising a current control circuit operable to control said current supplied by said current supply circuitry.

4. The transmission line terminator of claim 1, and further comprising undershoot circuitry coupled to said transmission line and operable to prevent voltage undershoot on said transmission line.

5. The transmission line terminator of claim 1, and further comprising overshoot circuitry coupled to said transmission line and operable to prevent voltage overshoot on said transmission line.

6. The transmission line terminator of claim 1, wherein said transmission line is a communications bus.

7. The transmission line terminator of claim 1, wherein said transmission line is a single ended bus transmission line.

8. The transmission line terminator of claim 1, in which:

said sensing circuitry includes a first transistor having a current path coupled between a first voltage source and a first node and a control electrode coupled to a second node, said first node coupled to said transmission line;

said voltage reference circuitry includes a second transistor having a current path coupled between said first node and a second voltage source and a control electrode for receiving said reference voltage;

said current supply circuitry includes a third transistor having a current path coupled between said first voltage source and said first node and a control electrode for receiving a reference current.

9. The transmission line terminator of claim 8, in which said first, second, and third transistors are bipolar transistors.

10. The transmission line terminator of claim 9, in which:

said first transistor in an NPN transistor having a collector coupled to said first voltage source and an emitter coupled to said first node;

said second transistor is a PNP transistor having an emitter coupled to a base of said first transistor, a collector coupled to said second voltage source, and a base for receiving said reference voltage;

said third transistor is a PNP transistor having an emitter coupled to said first voltage source, a collector coupled to said base of said first transistor, and a base for receiving said reference current.

11. The transmission line terminator of claim 8, in which when said voltage of said transmission line is less than said predetermined voltage said second transistor is turned off, said third transistor supplies a current to said control electrode of said first transistor, and said first transistor supplies current to said transmission line.

12. The transmission line terminator of claim 8, in which when said voltage of said transmission line exceeds said predetermined voltage said second transistor is turned on to cause a voltage substantially equal to said reference voltage to be output on said transmission line.

13. A method of terminating a transmission line, comprising the steps of:

sensing a voltage on the transmission line;

coupling a reference voltage to the transmission line in response to sensing a predetermined voltage on the transmission line; and delivering current to the transmission line in response to sensing voltages less than the predetermined voltage, the delivered current having a magnitude non-linearly related to the sensed voltage.

14. The method of claim 13, wherein the predetermined voltage equals the reference voltage.

15. The method of claim 13, and further comprising the step of preventing voltage undershoot on the transmission line.

16. The method of claim 13, and further comprising the step of preventing voltage overshoot on the transmission line.

17. The method of claim 13, wherein the transmission line is a communications bus.

18. The method of claim 13, wherein the transmission line is a single ended bus transmission line.

* * * * *